(12) United States Patent
Naguib et al.

(10) Patent No.: US 8,107,517 B2
(45) Date of Patent: Jan. 31, 2012

(54) AVERAGE-TAP ENERGY BASED THRESHOLDING FOR CHANNEL ESTIMATION IN MULTI ANTENNA SYSTEMS

(75) Inventors: Ayman Fawzy Naguib, Cupertino, CA (US); Dhananjay Ashok Gore, San Diego, CA (US); Alexei Gorokhov, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 984 days.

(21) Appl. No.: 11/560,735

(22) Filed: Nov. 16, 2006

(65) Prior Publication Data

US 2007/0133668 A1 Jun. 14, 2007

Related U.S. Application Data

(60) Provisional application No. 60/749,241, filed on Dec. 9, 2005.

(51) Int. Cl.
*H04B 17/00* (2006.01)
(52) U.S. Cl. ........ 375/227; 375/229; 375/230; 375/231; 375/232; 375/316; 375/340; 375/346; 455/63.1; 455/67.11; 455/67.13; 455/114.2; 455/296; 370/335; 370/342; 708/300
(58) Field of Classification Search .......... 375/227, 375/229, 230, 231, 232, 316, 340, 346; 455/63.1, 455/67.11, 67.13, 114.2, 296; 370/335, 342; 708/300
See application file for complete search history.

(56) References Cited

U.S. PATENT DOCUMENTS

| | | | |
|---|---|---|---|
| 5,446,922 A | 8/1995 | Siwiak et al. | |
| 5,903,610 A * | 5/1999 | Skold et al. | 375/285 |
| 6,408,023 B1 | 6/2002 | Abdesselem | |
| 6,907,092 B1 | 6/2005 | Yakhnich | |
| 7,382,842 B2 * | 6/2008 | Mudulodu et al. | 375/347 |
| 7,609,773 B2 * | 10/2009 | Bhushan et al. | 375/260 |
| 2005/0254589 A1 | 11/2005 | Higuchi | |

FOREIGN PATENT DOCUMENTS

WO 2006113419 10/2006

OTHER PUBLICATIONS

International Search Report—PCT/US06/061708, International Search Authority—European Patent Office—Dec. 6, 2007.
Taiwanese Search report—095146030—TIPO—Jul. 18, 2010.
Written Opinion—PCT/US2006/061708, International Search Authority, European Patent Office, Jun. 12, 2007.

* cited by examiner

*Primary Examiner* — Leon Flores
(74) *Attorney, Agent, or Firm* — Stanton Braden (57) ABSTRACT

Techniques to facilitate estimating the frequency response of a wireless channel in an OFDM system are provided. The method and systems allow for combining signal information across multiple communication channels at one or more channel tap delays in order to determine appropriate taps for channel information.

16 Claims, 7 Drawing Sheets

AVERAGE-TAP ENERGY BASED THRESHOLDING FOR CHANNEL ESTIMATION IN MULTI ANTENNA SYSTEMS

CROSS-REFERENCE TO RELATED APPLICATIONS

This application claims the benefit of U.S. Provisional Application Ser. No. 60/749,241, filed Dec. 9, 2005, entitled "AVERAGE-TAP ENERGY BASED THRESHOLDING FOR CHANNEL ESTIMATION IN MULTI ANTENNA SYSTEMS," the entirety of both of which are incorporated herein by reference.

BACKGROUND

I. Field

The present disclosure relates generally to wireless communication, and more specifically to techniques for estimating the propagation channel in a wireless communication system.

II. Background

Currently there are numerous wireless communication systems which provide various types of communication services such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiple access (OFDMA) systems.

OFDM effectively partitions the overall system bandwidth into a number of (N) orthogonal subbands. These subbands are also referred to as tones, frequency bins, and frequency subchannels. With OFDM, each subband is associated with a respective subcarrier upon which data may be modulated. Each subband may thus be viewed as an independent transmission channel that may be used to transmit data.

In a wireless communication system, an RF modulated signal from a transmitter may reach a receiver through a number of propagation paths. For an OFDM system, the N subbands may experience frequency selective fading due to the effects of fading and multipath.

An accurate estimate of the response of the wireless channel between the transmitter and the receiver is normally needed in order to effectively decode the transmit data on the available subbands. In OFDM systems, the propagation channel is estimated by sending several pilot tones in the frequency domain. The receiver extracts these pilot measurements in the frequency domain and performs an IFFT operation to get an estimate for the impulse response of the channel in the time domain. The length of this impulse response is normally limited to the length of the cyclic prefix of the OFDM symbol. Since these pilot measurements may be corrupted by noise at the receiver, there will be energy in all impulse response taps. However, not all the taps in the estimated impulse response correspond to an actual channel taps. Some of the taps will have energy due to noise only. One method to reduce to effect of noise in the impulse response taps is to identify the taps that are most likely due to noise and zero them out, thereby suppressing the noise effect from those taps. However, if the signal to noise ratio (SNR) is very low, there is a strong likelihood that noise-only taps will have more energy than actual channel taps. In this case, the noise-only taps will be picked instead of the actual channel taps, leading to an inaccurate estimate of the channel impulse response.

There is therefore a need in the art for techniques to more efficiently estimate the channel response in a multi-channel OFDM system.

SUMMARY

Techniques are provided herein to estimate the frequency response of a wireless channel in a communication system with multiple subbands (e.g., an OFDM system). In an aspect, a receiver with multiple receive antennas may estimate the channels to all utilized receive antennas. In some cases, these multiple channels may be independent. In an aspect, the receiver computes the average tap energy for a given possible tap position averaged over the antenna channels. Using this estimated tap energy profile, the receiver can estimate the possible tap position by selecting the tap position whose corresponding average tap energy exceeds a predetermined energy level and up to a predetermined number of multipath components.

In one embodiment, a method is provided for estimating the frequency response of the wireless channel (e.g., in the OFDM system). In accordance with the method a communication signal is received over a plurality of wireless communication channels. The signal energy of the communication signal at a plurality of channel taps is measured. A signal energy value at a given tap position as a function of the measured energy at the plurality of channel taps is determined, and a subset of channel taps is selected based on determining. In other aspects, a computer program product may embody instructions, that when used by a computer can perform the functions of the method.

Various aspects and embodiments of the disclosure are described in further detail below.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The channel estimation techniques described herein may be used for any communication system with multiple subbands. For clarity, these techniques are described for an OFDM system, however other multiple-access schemes may use the same approaches. Various embodiments are now described with reference to the drawings, wherein like reference numerals are used to refer to like elements throughout.

In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

Figure 1:
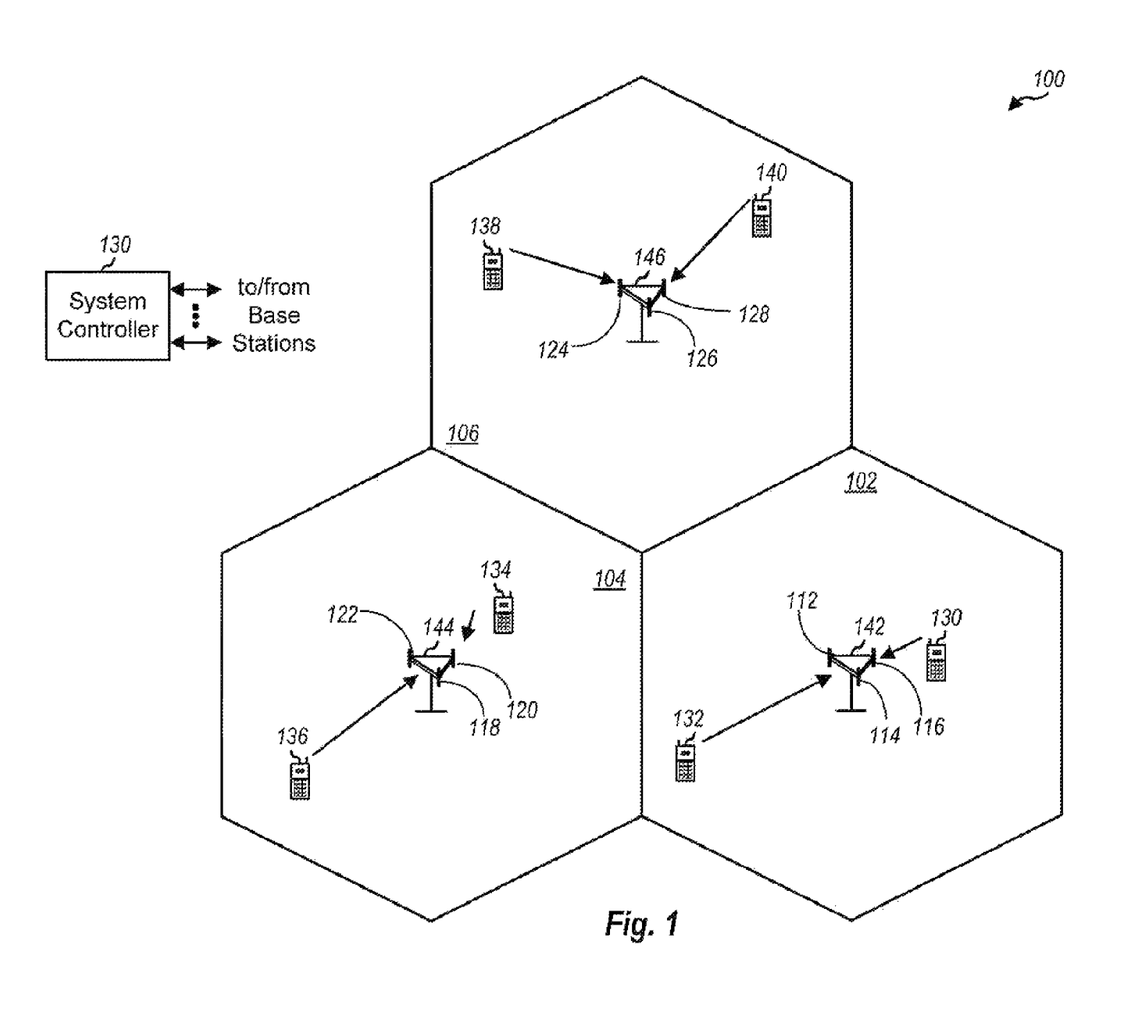
FIG. 1 illustrates aspects of a multiple access wireless communication system according to an embodiment.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors may be formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which may be in communication with one or more sectors of each access point. For example, access terminals 130 and 132 are in communication with base station 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of it respective cell relative to each other access terminal in the same cell. Further, each access terminal may be a different distance from the corresponding antenna groups with which it is communicating. Both of these factors provide situations, due to environmental and other conditions in the cell, which cause different channel conditions to be present between each access terminal and the corresponding antenna group with which it is communicating.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, a terminal, a mobile station or some other terminology.

Figure 2:
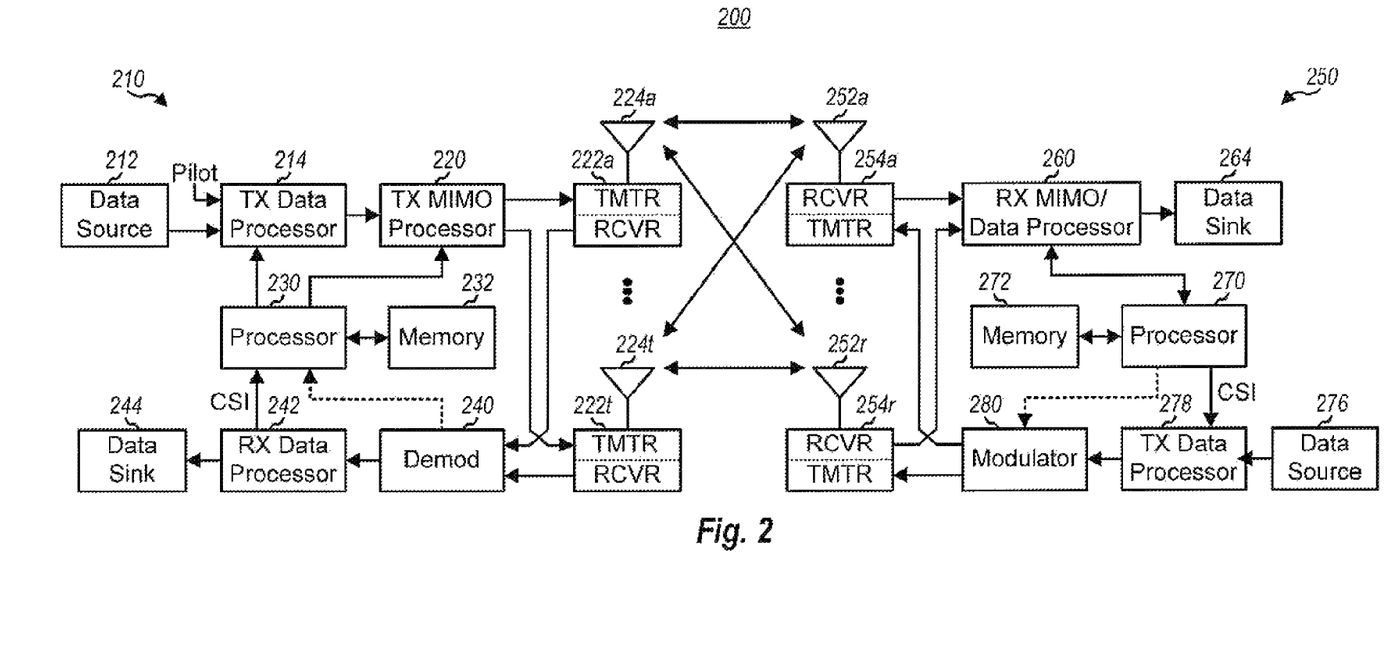
FIG. 2 illustrates aspects of a transmitter and receiver in a multiple access wireless communication system.

Referring to FIG. 2, one embodiment of a transmitter and receiver in a multiple access wireless communication system is illustrated. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides estimated channel state information (CSI), which may comprise various types of information regarding the communication link and/or the received data stream. For example, the CSI may comprise only the operating SNR. The CSI is then processed by a TX data processor 214 which also receives traffic data for a number of data streams from a data source 276, modulated by a modulator 280, conditioned by transmitters 254a through 254r, and transmitted back to transmitter system 210.

At transmitter system 210, the modulated signals from receiver system 220 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) to generate various controls for TX data processor 214 and TX MIMO processor 220.

At the receiver, various processing techniques may be used to process the $N_R$ received signals to detect the $N_T$ transmitted symbol streams. Exemplary techniques may include: (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_s$ independent channels, with $N_s \leq \min\{N_T, N_R\}$. Each of the $N_s$ independent channels may also be referred to as a spatial subchannel (or a transmission channel) of the MIMO channel and corresponds to a dimension.

For a full-rank MIMO channel, where $N_s = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power.

Figure 3:
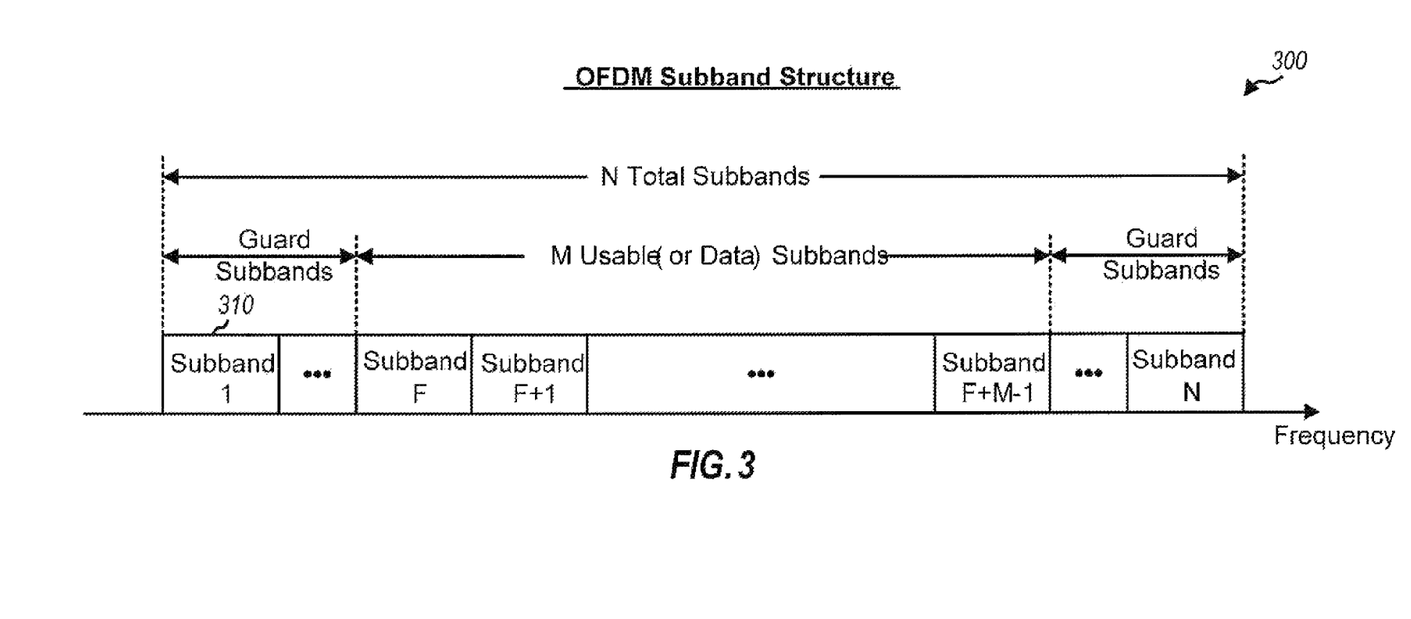
FIG. 3 illustrates an OFDM subband structure.

Referring to FIG. 3, a subband structure 300 that may be used for an OFDM system is shown. The OFDM system has an overall system bandwidth of W MHz, which is partitioned into N orthogonal subbands using OFDM. Each subband has a bandwidth of W/N MHz. In a typical OFDM system, only M of the N total subbands are used for data transmission, where M<N. These M usable subbands are also referred to as data subbands. The remaining N−M subbands are not used for data transmission and serve as guard subbands to allow the OFDM system to meet spectral mask requirements. The M usable subbands include subbands F through F+M−1.

For OFDM, the data to be transmitted on each subband is first modulated (i.e., symbol mapped) using a particular modulation scheme selected for use for that subband. The signal value is set to zero for each of the N−M unused subbands. For each symbol period, the N symbols (i.e., the M modulation symbols and N−M zeros) are transformed to the time domain using an inverse fast Fourier transform (IFFT) to obtain a "transformed" symbol that includes N time-domain samples. The duration of each transformed symbol is inversely related to the bandwidth of each subband. For example, if the system bandwidth is W=20 MHz and N=256, then the bandwidth of each subband is 78.125 KHz (or W/N MHz) and the duration of each transformed symbol is 12.8 μsec (or N/W μsec).

OFDM can provide certain advantages, such as the ability to combat frequency selective fading, which is characterized by different channel gains at different frequencies of the overall system bandwidth. It is well known that frequency selective fading is accompanied by inter-symbol interference (ISI), which is a phenomenon whereby each symbol in a received signal acts as distortion to subsequent symbols in the received signal. The ISI distortion degrades performance by impacting the ability to correctly detect the received symbols. Frequency selective fading can be combated for OFDM by repeating a portion of (or appending a cyclic prefix to) each transformed symbol to form a corresponding OFDM symbol, which is then transmitted over a wireless channel.

The length of the cyclic prefix (i.e., the amount to repeat) for each OFDM symbol is dependent on the delay spread of the system. The delay spread for a given transmitter is the difference between the earliest and latest arriving signal instances at a receiver for a signal transmitted by the transmitter. The delay spread of the system is the expected worst-case delay spread for all terminals in the system. To effectively combat ISI, the cyclic prefix is generally longer than the delay spread of the system.

Each transformed symbol has a duration of N sample periods, where each sample period has a duration of (1/W) μsec. The cyclic prefix may be defined to include Cp samples, where Cp is a suitable integer selected based on the delay spread of the system. In particular, Cp is selected to be greater than or equal to the number of taps (L) for the impulse response of the wireless channel (i.e., $Cp \geq L$). In this case, each OFDM symbol would include N+Cp samples, and each symbol period would span N+Cp sample periods.

The N subbands of the OFDM system may experience frequency selective fading due to different channel conditions (i.e., different effects due to fading and multipath) and may be associated with different complex channel gains. An accurate estimate of the channel response is normally needed in order to properly process (e.g., decode and demodulate) data at the receiver.

The wireless channel in the OFDM system may be characterized by either a time-domain channel impulse response, h, or a corresponding frequency-domain channel frequency response, H. The channel frequency response H is the DFT of the channel impulse response h. This relationship may be expressed in matrix form, as follows:

$$H = Wh, \qquad \text{Eq(1)}$$

where h is an (N×1) vector for the impulse response of the wireless channel between the transmitter and the receiver in the OFDM system;

H is an (N×1) vector for the frequency response of the wireless channel; and

W is an (N×N) matrix used to perform the DFT on the vector h to obtain the vector H.

The matrix W is defined such that the (n,m)-th entry, $W_{n,m}$, is given as:

$$w_{n,m} = \frac{1}{\sqrt{N}} e^{-j2\pi \frac{(n-1)(m-1)}{N}}, \qquad \text{Eq (2)}$$

for $n \in \{1 \ldots N\}$ and $m \in \{1 \ldots N\}$.

The vector h includes one non-zero entry for each tap of the channel impulse response. Thus, if the channel impulse response includes L taps, where L<N, then the first L entries of the vector h would be L non-zero values and the (N−L) following entries would be zeros. However, the techniques described herein apply equally even if the L non-zero values are some arbitrary selection within the N entries in the vector h.

Figure 4A:
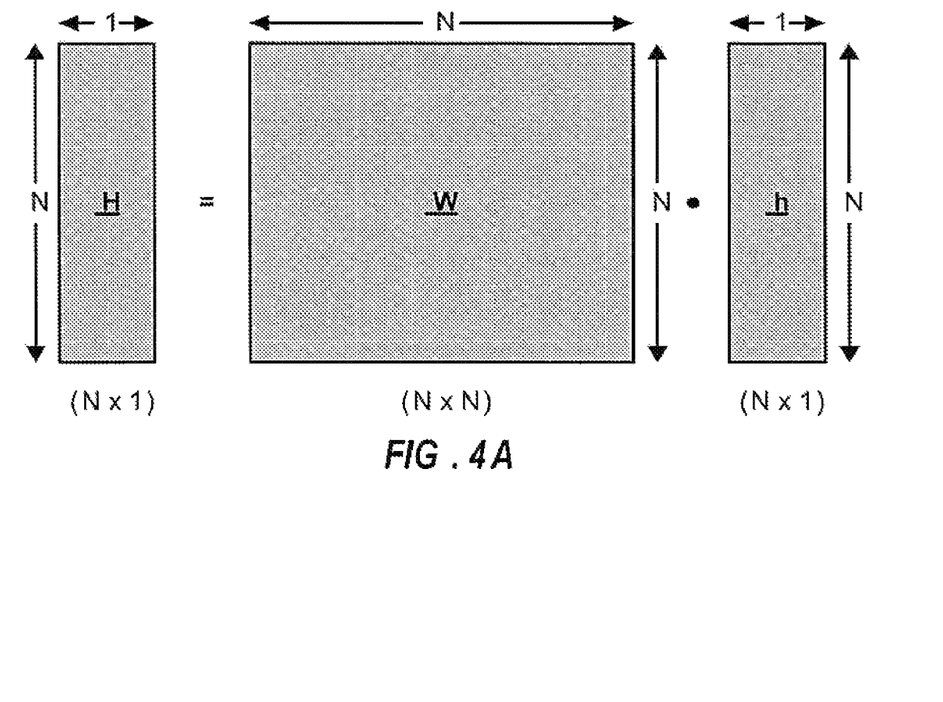
FIG. 4A illustrates the relationship between the frequency response and the impulse response.

Referring to FIG. 4A a graphical illustration shows the relationship between the channel frequency response H and the channel impulse response h. The vector h includes N time-domain values for the impulse response of the wireless channel from the transmitter to the receiver. This vector h can be transformed to the frequency domain by pre-multiplying it with the DFT matrix W. The vector H includes N frequency-domain values for the complex channel gains of the N subbands.

Figure 4B:
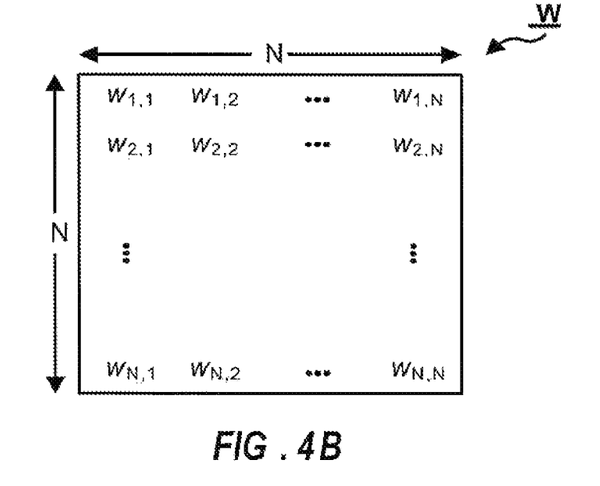
FIG. 4B illustrates a discrete Fourier Transform (DFT) matrix for the N total subbands in the OFDM system.

Referring to FIG. 4B. a graphical illustration shows the matrix W, which is an (N×N) matrix comprised of the elements defined in equation (2).

It is recognized that the impulse response of the wireless channel can be characterized by L taps, where L is typically much less than the number of total subbands in the system (i.e., L<N). That is, if an impulse is applied to the wireless channel by the transmitter, then L time-domain samples (at the sample rate of W) would be sufficient to characterize the response of the wireless channel based on this impulse stimulus. The number of taps L for the channel impulse response is dependent on the delay spread of the system, with a longer delay spread corresponding to a larger value for L, i.e. each tap can be thought of a delay and the increments for each of the taps.

Because only L taps are needed for the channel impulse response, the channel frequency response H lies in a subspace of dimension L (instead of N). More specifically, the frequency response of the wireless channel may be fully characterized based on the channel gains for as few as L appropriately selected subbands, instead of all N subbands.

Figure 5:
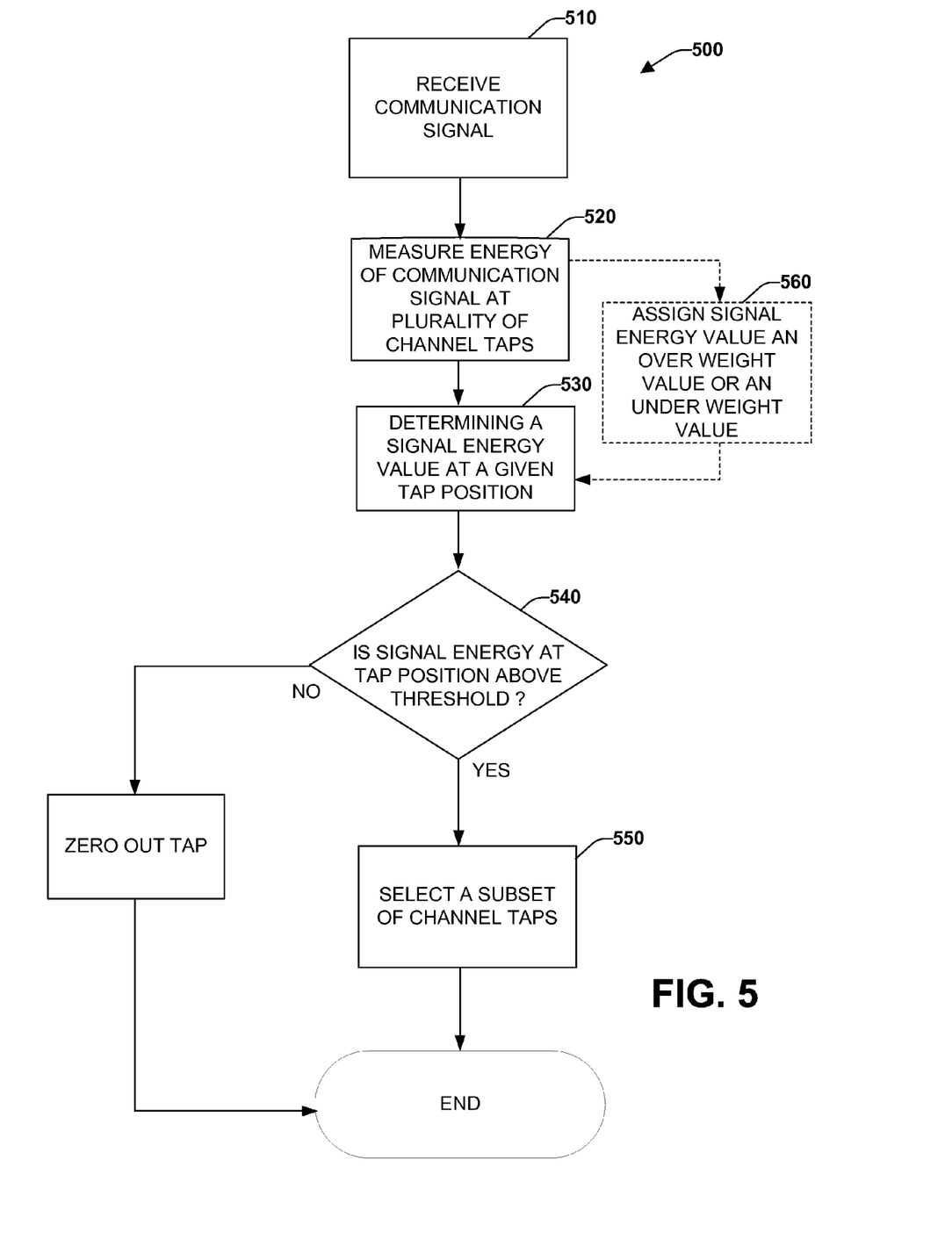
FIG. 5 shows a process for estimating the frequency response of the wireless channel.

FIG. 5 is a flow diagram illustrating a process for estimating the frequency response of a wireless communication channel, and selecting a communications channel subset from a plurality or fixed range of signal paths spread over time, 500. At 510, a signal received over a plurality of wireless communication channels is input, e.g. used, at a receiver for further processing. It is to be appreciated that the receiver can be associated with substantially any type of device such as a cell phone, personal computer, hand held computer, or at other points in the transmission process such as at a base station. At 520, the energy of the communication signal at a plurality of channel taps is measured. In an embodiment the communication signal can be a pilot signal. At 530, a signal energy value at a given tap position is determined as a function of the measured energy at the plurality of channel taps, and at 540 a decision is made as to whether or not a received signal path is above (or below) a predetermined threshold. If the signal path is below the threshold, the tap associated with the signal path element may be zeroed out, discarded or the like. If the signal path is above the threshold at 540, the process proceeds to 550 and the communication tap associated with the signal path is selected for the subset of communication taps and is employed in the reconstruction of the communication channel. In an alternative, the process 500 may include at 560 (shown dashed to denote an alternative aspect) assigning the signal energy value an over weight value or an under weight value, prior to determining at 530.

For purposes of simplicity of explanation, the methodologies are shown and described herein as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Figure 6:
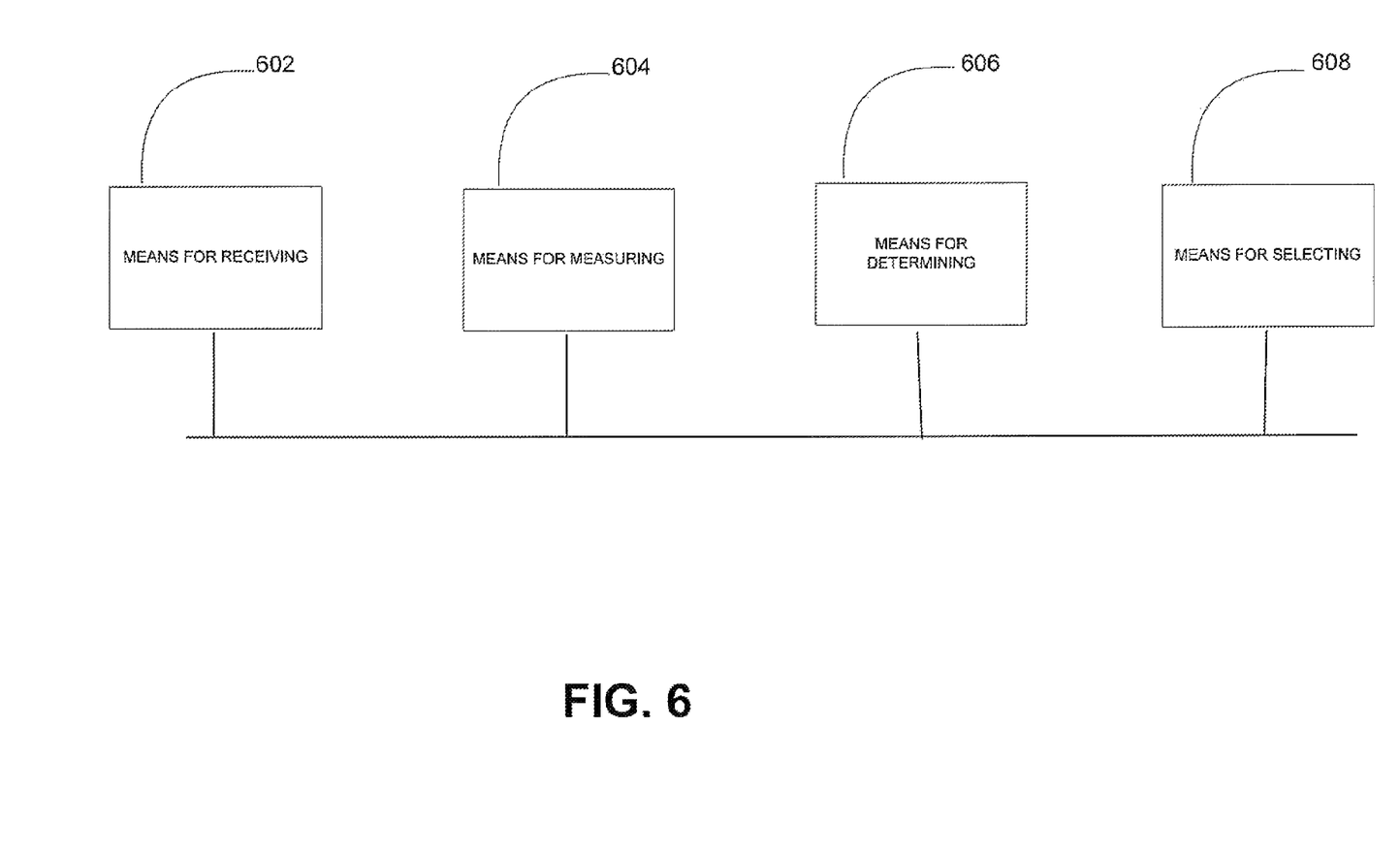
FIG. 6 illustrates a functional block diagram of an apparatus for estimating the frequency response of a wireless channel in a communication system.

Referring to FIG. 6, a functional block diagram for estimating the frequency response of a wireless channel in a communication system 600 is illustrated. A communication signal received over a plurality of wireless communication channels is provided by means for receiving, 602. The energy of the communication signal is measured at a plurality of channel taps by means for measuring, 604. Means for determining, 606 determines a signal value at a given channel tap position as a function of the output of means for measuring, 604. Means for selecting, 608 selects a subset of channel taps based on the output of means for determining 606.

Figure 7:
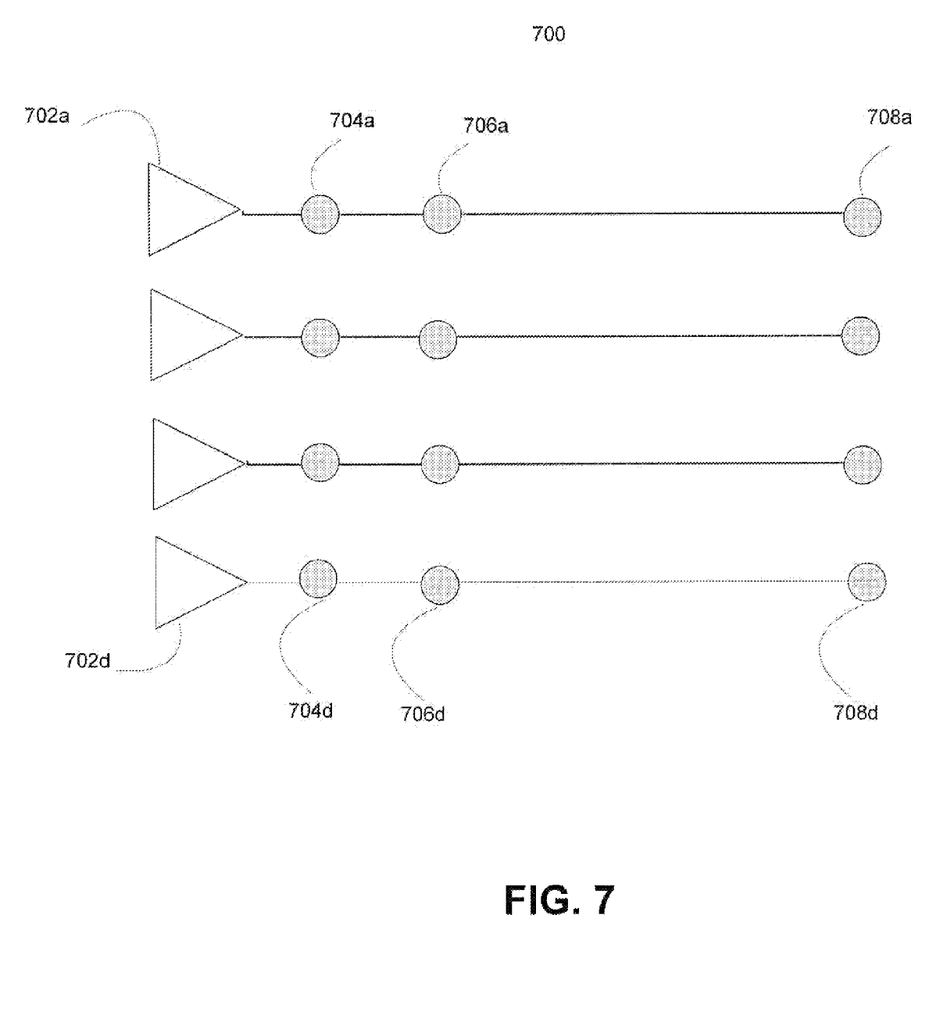
FIG. 7 Illustrates a configuration for a communication signal over a plurality of wireless communication channels.

Referring to FIG. 7, a diagram showing a communication signal over a plurality of wireless communication channels is illustrated, 700. Transmit antennas 702a-702d transmit a communication signal. In a wireless communication system, an RF modulated signal from a transmitter 224 may reach a receiver 252 through a number of propagation paths. For an OFDM system, the N subbands may experience frequency selective fading due to the effects of fading and multipath. In OFDM systems, the propagation channel is estimated by sending several pilot tones in the frequency domain. The receiver 252 extracts these pilot measurements in the frequency domain and performs an IFFT operation to get an estimate for the impulse response of the channel in the time domain. Since these pilot measurements may be corrupted by noise at the receiver, there will be energy in multiple impulse response taps, 704-708. However, not all the taps in the estimated impulse response correspond to an actual channel taps. Some of the taps will have energy due to noise. The different impulse response taps reflect time delays in the signal arriving at the receiver, 252. As discussed these delays are often due to different signal propagation paths which result from the effects of fading, multipath and the like. As used herein, a given channel tap position is used to describe the energy received on a given channel at a given point (or window) of time. For example, channel taps 704a-704d represent channel taps at relatively similar positions. That is channel taps 704a-704d are relatively close in time from one another. In an embodiment shown in 700, the communication signal transmitted through antennas 702a-702d may arrive at a receiver 254 with different delays. While the signal transmitted through antennas 702a-702d have independent physical channels, they have similar power-delay profiles.

Virtual channels are a linear sum of the same physical channels by use of orthogonal transformation. Hence, they will have similar channel tap positions. Thus, in one embodiment, channel taps 704a-704d, 706a-706d, and 708a-708d respectively will have similar channel tap positions. By averaging the energy of 704a-704d, the value obtained can be used to determine if the taps are primarily noise energy, or if the energy is from the desired signal. Generally, most channel taps contain some portion of noise energy. However, by averaging the energy across most or all antennas at similar channel tap positions, the value produced can be used to determine the channel tap(s) with signal energy, without influence of a noise component at one tap position. Channel tap positions 706a-706d, 708a-708d are so forth are handled as described with respect to 704a-704d. An energy value will be produced as a function of a determined number of channel tap positions. In one embodiment, the value obtained by averaging the same channel tap position from a plurality of channels. For example, the channels created by antennas 702a-702d, can be compared to a threshold. Channel tap positions with a value over the threshold may be used to create a subset of channel taps, and channel tap positions with a value below the threshold will not be used to create a subset of channel taps. The result is a more accurate estimate of the response of the wireless channel between the transmitter 224 and the receiver 252.

The channel estimation techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

For a firmware and/or software implementation, the techniques may be implemented with instructions (e.g., procedures, codes, functions, and so on) that perform the functions described herein and that comprise a computer program product. The instructions or software codes may be stored in a computer readable medium of the computer program product. The memory may be implemented within the processor or external to the processor.

Further, time-frequency segments are exemplary resources that may be assigned for signaling and data. The time-frequency segments may also comprise frequency subcarriers, transmission symbols, or other resources, in addition to time frequency segments.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing channel estimation in a multi-channel OFDM wireless communication system, to more efficiently estimate a channel impulse response when the signal to noise interference ratio is very low and the noise only taps have more energy than actual channel taps comprising:
receiving a communication signal over a plurality of wireless communication channels;
measuring energy of the communication signal at a plurality of channel taps in a receiver;
determining a signal energy value at a given channel tap position as a function of the measured energy at the plurality of channel taps by averaging measured signal energy at channel taps with the same position as the given channel tap position across at least two receive antennas; and
selecting a subset of channel taps in the receiver based on the signal energy value;
wherein selecting comprises selecting when the signal energy value is above a threshold.

2. The method of claim 1, wherein the threshold is configurable.

3. The method of claim 1, further comprising:
assigning the signal energy value an over weight value or an under weight value, prior to determining.

4. The method of claim 1, wherein measuring comprises estimating a Signal-to-Noise Ratio (SNR).

5. The method of claim 1, further comprising:
discarding the channel taps that are not selected.

6. The method of claim 1, further comprising:
providing feedback on the Forward Link or Reverse Link to improve the channel estimate.

7. A multi-channel OFDM wireless communication apparatus to provide more efficient estimation of a channel impulse response when the signal to noise interference ratio is very low and the noise only taps have more energy than actual channel taps comprising:
a processor configured to:
receive a communication signal over a plurality of wireless communication channels;
measure energy of the communication signal at a plurality of channel taps;
determine a signal energy value at a given channel tap position as a function of the measured energy at the plurality of channel taps by averaging the signal energy at channel taps with the same position as the given channel tap position across at least two receive antennas; and
select a subset of channel taps based on the signal energy value; wherein the processor is configured to select when the signal energy value is above a threshold.

8. The apparatus of claim 7, wherein the processor is configured such that the threshold is configurable.

9. The apparatus of claim 7, wherein the processor is configured to give the signal energy an overweight value or an underweight value.

10. The apparatus of claim 7, wherein the processor is configured to measure by estimating a Signal-to-Noise Ratio (SNR).

11. The apparatus of claim 7, wherein the processor is configured to provide feedback on a Forward Link or Reverse Link to improve the channel estimate.

12. A multi-channel OFDM wireless communication apparatus to provide more efficient estimation of a channel impulse response when the signal to noise interference ratio is very low and the noise only taps have more energy than actual channel taps comprising:
means for receiving a communication signal over a plurality of wireless communication channels;
means for measuring energy of the communication signal at a plurality of channel taps;
means for determining a signal energy value at a given channel tap position as a function of the measured energy at the plurality of channel taps by averaging measured signal energy at channel taps with the same position as the given channel tap position across at least two receive antennas; and
means for selecting a subset of channel taps based on the signal energy value; wherein the means for selecting comprises selecting when the signal energy is above a threshold.

13. The apparatus of claim 12, wherein the threshold is configurable.

14. The apparatus of claim 12, wherein the means for selecting is based on giving the signal energy value an overweight value or an underweight value.

15. The method of claim 12, wherein means for measuring comprises estimating a Signal-to-Noise Ratio (SNR).

16. A non-transitory computer readable medium storing a computer program, wherein execution of the computer program is for performing channel estimation in a multi-channel OFDM wireless communication system to more efficiently improve estimating a channel impulse response when the signal to noise inference ratio is very low and the noise only taps have more energy than actual channel taps, comprising:
measuring energy of the communication signal at a plurality of channel taps;
determining a signal energy value at a given channel tap position as a function of the measured energy at the plurality of channel taps by averaging measured signal energy at channel taps with the same position as the given channel tap position across at least two receive antennas; and
selecting a subset of channel taps based on the signal energy value; wherein selecting comprises selecting when the signal energy value is above a threshold.

* * * * *